Oct. 11, 1960          L. E. SHUMAKER ET AL          2,955,369
                              PLOW FRAME
Filed Aug. 25, 1958                              2 Sheets-Sheet 2
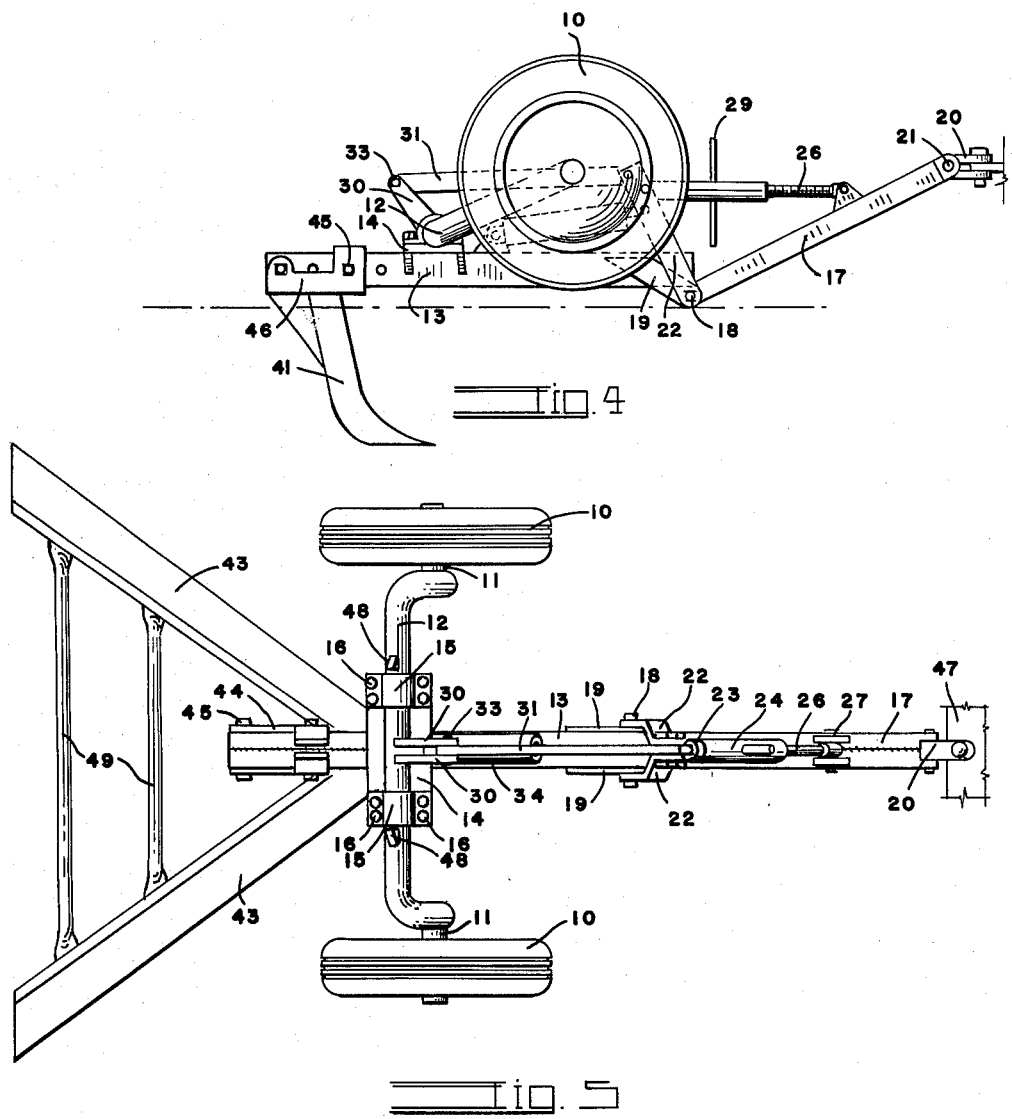
INVENTOR.
LAWRENCE E. SHUMAKER
CECIL I. BECK
BY
ATTORNEY United States Patent Office 2,955,369
Patented Oct. 11, 1960

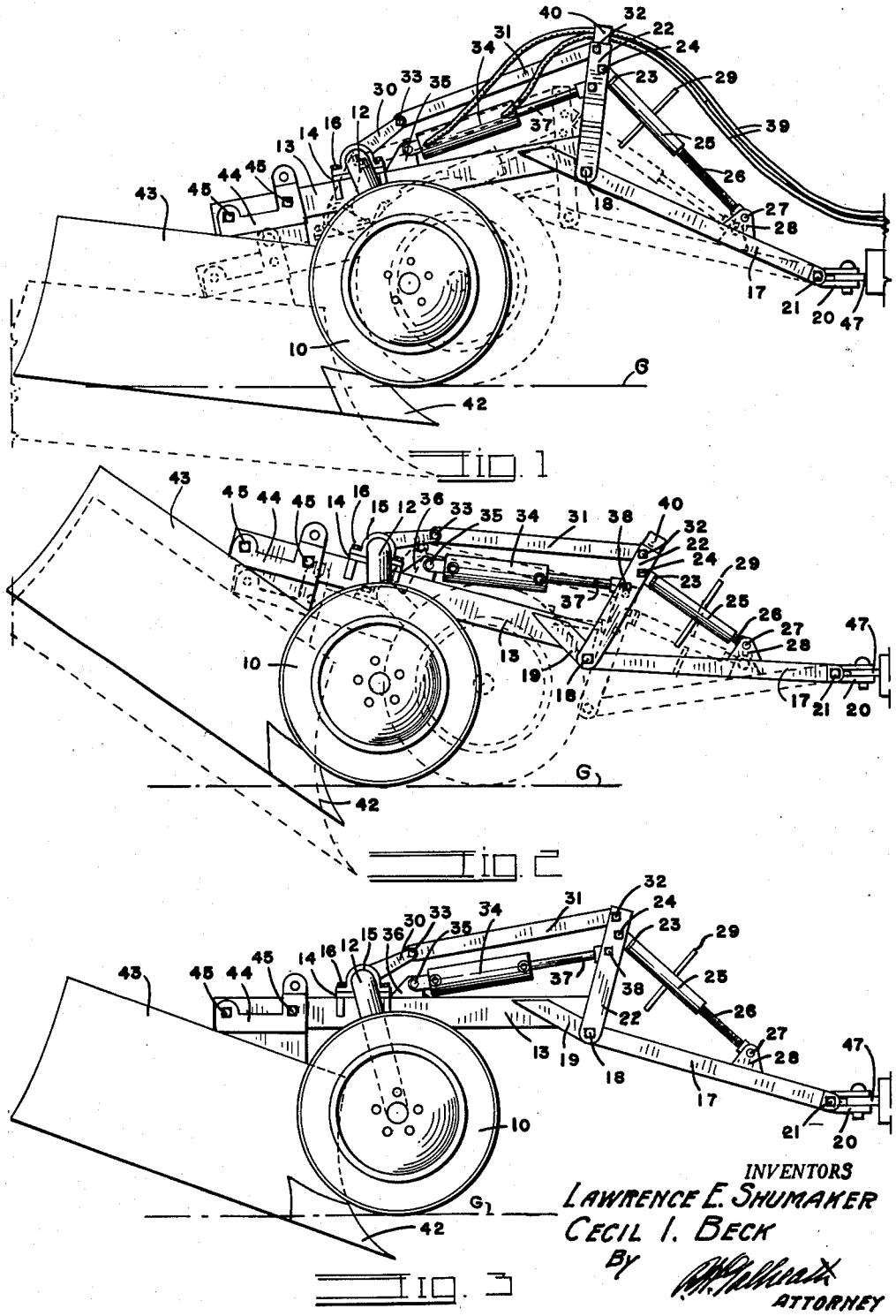

2,955,369
PLOW FRAME

Lawrence E. Shumaker and Cecil I. Beck, Denver, Colo., assignors to Eversman Manufacturing Co., Denver, Colo., a corporation of Colorado Filed Aug. 25, 1958, Ser. No. 756,822

2 Claims. (Cl. 37—98)

This invention relates to a wheeled frame for supporting soil plowing attachments of various types. It is more particularly designed for use with ditch-digging plows but is not limited to this specific use. The principal object of the invention is to provide a simple, economical, and highly efficient plow frame for attachment to a tractor or other towing vehicle which can be quickly and easily preset to position a plow at any desired angle to the ground surface, and which can be controlled by the operator of the tractor to raise or lower the plow for plowing at any desired depth while maintaining the preset angle.

The functions of the improved frame are particularly valuable when used with a ditching plow, since they enable the plow to be preset for any desired width of ditch, while allowing the operator full control as to the depth of the ditch.

Another object of the invention is to provide a ditching plow frame in which the weight will be evenly distributed and properly balanced so that the ditching plow can be handled and maneuvered easily, and so that the desired depth will be accurately maintained throughout the entire length of the ditch.

A further object of the invention is to provide a plow frame which can be lowered to a substantially horizontal position immediately above the ground for deep subsoil plowing, and which can be quickly and easily elevated to support the plow well above the ground surface for ready transportation.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a side elevation of the improved plow frame with a ditching plow in place thereon, illustrating the frame preset to maintain the ditching plow at an angle to produce a ditch of maximum width;

Fig. 2 is a similar view illustrating the plow frame preset to produce a ditch of minimum width;

Fig. 3 is a similar view illustrating the plow frame preset for a ditch of an intermediate width;

Fig. 4 is a similar view illustrating the improved plow frame with a subsoil plow or pan-breaking attachment in place thereon and adjusted for plowing at maximum depth; and Fig. 5 is a plan view of the plow frame with the ditching plow thereon as it would appear in the position of Fig. 1.

In Figs. 1 and 2 increased depth positions have been indicated in broken line. In Fig. 1 conventional hydraulic hoses have been indicated at 39. For the sake of clarity, these hoses have been omitted in the remaining views.

The improved plow frame is supported upon pneumatically tired, automotive type, demountable wheels 10 mounted on axle spindles 11 projecting oppositely outward from the separated extremities of an inverted, U-shaped, tubular axle 12. A main frame beam 13, preferably formed as a hollow box by welding the flanges of two structural channels together, is pivotally supported from the mid-portion of the axle 12. A cross frame plate 14 is welded across the top of the main frame beam 13 at a point slightly to the rear of its middle. The axle is clamped in rotatable engagement with the cross frame plate 14 by means of bearing straps 15 which are secured to the frame plate 14 by means of suitable cap screws or bolts 16. Sidewise movement of the straps 15 is prevented by means of lugs 48 welded to the axle 12. The forward extremity of the main frame beam 13 is supported from a hollow, rectangular tongue member 17.

The rear extremity of the tongue member 17 is hingedly mounted upon a hinge pin or bolt 18 which is mounted in or supported below the forward extremity of the main frame beam 13 by means of suitable bracket members 19. The forward extremity of the tongue member 17 terminates in a conventional draw bar hitch 20 pivotally secured thereto on a draw bar bolt 21 and arranged to be connected to the draw bar of any towing vehicle, such as a tractor or truck, as indicated on the drawing at 47.

A pair of post members 22 are hingedly mounted on the hinge pin 18 at the opposite extremities of the latter and arise substantially vertically therefrom. A jackscrew nut swivel 23 is pivotally mounted on a swivel bolt 24 extending through the post members 22 adjacent their upper extremities. A tubular jackscrew nut 25 is swivelly mounted on the swivel 23 and is threaded upon a jackscrew 26. The forward extremity of the jackscrew 26 is pivotally mounted upon a jackscrew pivot 27 supported by suitable brackets 28 mounted on the tongue member 17. The jackscrew nut 25 is preferably provided with suitable hand grip handles 29 by means of which it may be easily rotated on the jackscrew 26 to vary the included angle between the post members 22 and the tongue member 17.

The upper extremities of the upright members 22 are connected to cranks 30 welded or otherwise secured to and at the middle of the horizontal portion of the inverted, U-shaped axle 12 by means of a connecting bar 31. The connecting bar 31 terminates at its forward extremity on a pivot bolt 32, extending between the post members 22 above the swivel bolt 24, and at its rearward extremity upon a pivot bolt 33 which pivotally connects it to the cranks 30.

A double-acting hydraulic cylinder 34 is pivotally mounted at its rear extremity upon a cylinder bolt 35 in supporting brackets 36 welded to the upper face of the main frame beam 13 beneath the connecting bar 31 and forwardly of the axle 12. A hydraulic plunger 37 extends from the hydraulic cylinder 34 to a plunger pivot bolt 38 extending between the post members 22 below the swivel bolt 24. The hydraulic hoses 39 extend from the opposite extremities of the hydraulic cylinder 34, through a U-shaped supporting yoke 40 on the post members 22, forwardly to a conventional control valve and pump on the towing vehicle, as is usual with hydraulically operated implements.

Any desired earth-working implement may be attached to the beam 13. The frame, however, is more particularly intended for supporting a conventional ditching plow of a type provided with a sharp, replaceable, cutting point 42 from which two transversally curved mold boards 43 flare rearwardly and outwardly. The lower edges of the mold boards extend forwardly and are sharpened to a ground-cutting edge, and the curvated cross-section of the mold boards acts to roll the earth upwardly and outwardly to form a smooth ditch bank.

For the uses of this invention, the ditching plow is provided with a centrally located mounting bracket 44 which can be slipped over the rear extremity of the beam 13 and secured in place thereon by means of suitable attachment bolts 45 which extend through the beam. The bracket 44 is constructed to maintain the planes of the upper and lower edges of the mold boards 43 at an angle of substantially 25° to the axis of the main frame beam 13.

The subsoil plow attachment 41 for breaking the hard pan soil below the ground surface can be attached to the beam 13, as shown in Fig. 4, by simply removing the bolts 45 and sliding the ditcher bracket 44 from the beam, thence sliding a subsoiler bracket 46 in place thereon and securing it in place by means of the bolts 45.

It will be noted from the drawings that the point 42 of the ditching plow is positioned substantially directly below the axis of the wheels 10 so that the tendency of the plow point to dig downwardly is directly absorbed by the wheels 10 and the plow point 42 is maintained on the preset level. It will also be noted that the main plow frame 13 and the tongue member 17 serve in the nature of toggle links in that their connecting point can be swung upwardly and downwardly by manipulation of the jackscrew nut 25 to preset the angle of the plane of the plow in fixed relation to the ground level, indicated in broken line at "G."

Let us assume it is desired to form a relatively wide ditch. The jackscrew and nut combination is extended to substantially its full extension so as to bring the plow mold boards toward a horizontal position so that the full spread of the boards will enter the ground to produce the maximum width of ditch, as shown in Fig. 1. The depth of the ditch is controlled by the hydraulic cylinder 34 and its plunger 37, for if hydraulic fluid be discharged from the rear of the cylinder, the posts 22 will be swung rearwardly as shown in broken line, causing the hinge bolt 18 to descend. The downward movement of the rear extremity of the tongue member will cause the posts 22 to swing the cranks 30 rearwardly so as to rotate the crank axle to impart a similar downward movement to the rear extremity of the main frame beam 13. Thus, the entire plow and its mold boards will descend to a deeper depth while substantially maintaining the preset angle. For a narrower ditch, the jackscrew nut 25 is threaded further onto the jackscrew 26 as shown in Fig. 3. This lowers the forward extremity of the plow beam and raises the rear extremities of the mold boards 43 as shown in Fig. 3 to increase the ditch bank angle to cut a narrower ditch. For a ditch of minimum width the nut 25 is threaded completely onto the jackscrew 26 to depress the forward extremity of the main beam still further, as shown in Fig. 2, so as to incline the mold boards at a relatively steep angle. The ditch depth is then set by means of the hydraulic cylinder and its plunger as shown in broken line in Fig. 2.

For deep subsoil plowing the plunger 37 is retracted into the cylinder 34 to reduce the angle between the main frame beam and the post members 22 so that the latter will swing rearwardly to completely lift the wheels and allow the main beam to rest upon the ground as shown in Fig. 4.

While a specific form of the improvement has been described and illustrated herein, it is to be understood that the same may be varied within the scope of the appended claims, without departing from the spirit of the invention.

Having thus described the invention, what is claimed and desired secured by Letters Patent is:

1. An implement supporting frame comprising: a transversally-extending, inverted-U-shaped crank axle; a crank carried by a midpoint of said crank axle; a ground-engaging wheel mounted on each downwardly-turned extremity of said axle; a longitudinally extending main frame beam pivotally mounted on and extending forwardly and rearwardly from said axle; a tongue member; a pivot attaching said tongue member to the forward extremity of said main frame beam and extending forwardly in alignment with the latter to a hitch connection; an upright post member mounted on said pivot adjacent the forward extremity of said main frame beam; a first expansible device hingedly connecting an intermediate point of said post member to said tongue member for varying the angle therebetween; a second expansible device pivotally connecting said main frame member with an intermediate point of said post member for varying the angle therebetween; means including a link pivotally connecting said crank to the top of said upright post member for rotating said crank axle relative to said main frame member for varying the height of said latter member from the ground; and means for attaching a plow to the rear extremity of said main frame beam.

2. An implement supporting frame as described in claim 1 in which the first expansible member is manually actuatable and the second expansible member is hydraulically operable and remotely controlled.

References Cited in the file of this patent

UNITED STATES PATENTS

| | | |
|---|---|---|
| 2,691,930 | Forgy | Oct. 19, 1954 |
| 2,797,542 | Webster et al. | July 2, 1957 |

OTHER REFERENCES

John Deere Operator's Manual, OM–K45–157, Ditcher No. 12, deposited in Patent Office Jan. 28, 1957, page 2 relied on.